US012688124B2

(12) United States Patent
Gal et al.

(10) Patent No.: US 12,688,124 B2
(45) Date of Patent: Jul. 21, 2026

(54) CACHED RANDOM ACCESS MEMORY (RAM) COUNTER SYSTEM

(71) Applicant: Microsoft Technology Licensing, LLC, Redmond, WA (US)

(72) Inventors: Tama Gal, Haifa (IL); Yevgeny Yankilevich, Tirat Carmel (IL); Gil Savir, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 18/674,590

(22) Filed: May 24, 2024

(65) Prior Publication Data

US 2025/0363052 A1    Nov. 27, 2025

(51) Int. Cl.
G06F 12/0802 (2016.01)

(52) U.S. Cl.
CPC ............................... G06F 12/0802 (2013.01)

(58) Field of Classification Search
CPC ... G06F 7/38; G06F 7/46; G06F 7/461; G06F 7/498; G06F 7/4981; G06F 12/0802
USPC .......................................................... 377/94
See application file for complete search history.

(56) References Cited

U.S. PATENT DOCUMENTS

| | | | |
|---|---|---|---|
| 7,082,453 B1 | 7/2006 | Shackleford et al. | |
| 8,693,615 B2 * | 4/2014 | Adiga ........................ | G06F 1/04 |
| | | | 377/49 |
| 9,088,284 B2 * | 7/2015 | Bender ................... | H03K 21/00 |
| 10,962,595 B1 | 3/2021 | Broukhis et al. | |
| 2013/0145200 A1 | 6/2013 | Adiga et al. | |
| 2025/0362880 A1 * | 11/2025 | Gal ........................... | G06F 7/60 |

OTHER PUBLICATIONS

Ajane, et al., "Comparison of binary and LFSR counters and efficient LFSR decoding algorithm", IEEE, 54th International Midwest Symposium on Circuits and Systems, Aug. 7, 2011, 04 Pages.
International Search Report and Written Opinion received for PCT Application No. PCT/US2025/018035, mailed on Jul. 2, 2025, 15 pages.
International Search Report and Written Opinion received for PCT Application No. PCT/US2025/018040, mailed on Jun. 11, 2025, 18 pages.
Kahl, et al., "High Speed Counter Complex", Ip.com Prior art database, Nov. 1, 1981, 04 Pages.

(Continued)

*Primary Examiner* — Hai L Nguyen

(57) ABSTRACT

A cached random access memory (RAM) counter system comprises a plurality of incremental counter circuits associated with a plurality of count values that each maintain a plurality of least-significant bits of a respective count value and a respective carry bit; a RAM circuit that stores a plurality of most-significant bits of each respective count value; a single-bit multiplexer that receives the respective carry bit from each of the plurality of counter circuits and selectively provides a carry bit output for the respective count value; and an adder circuit that adds the carry bit output for the respective count value from the single-bit multiplexer to the plurality of most-significant bits of the respective count value and provides an updated plurality of most-significant bits of the respective count value for storage in the RAM circuit.

20 Claims, 2 Drawing Sheets

(56)                  References Cited

OTHER PUBLICATIONS

Morrison, et al., "Multistage Linear Feedback Shift Register Counters with Reduced Decoding Logic in 130-nm CMOS for Large-Scale Array Applications", IEEE Transactions on Very Large-Scale Integration (VLSI) Systems, vol. 27, Issue No. 01, Jan. 2019, pp. 103-115.

* cited by examiner

CACHED RANDOM ACCESS MEMORY (RAM) COUNTER SYSTEM

BACKGROUND

In the field of digital hardware design, traditional binary counters structured with carry ripple serially connected "Full Adders" have been a standard. However, these counters encounter substantial limitations in scenarios involving wide counters or high-frequency operations. For example, Full Adder counters are subject to propagation delay issues and inefficient area consumption. For instance, significant propagation delays arise due to a carry ripple effect in serial logic. As the counter length increases, the time it takes for a carry to propagate through all stages of the counter increases, leading to timing closure issues in high-speed circuits. Regarding area consumption, the design of a conventional counter with Full Adder circuits necessitates a larger area on the chip, mainly due to the extensive use of Full Adder circuits. This becomes more pronounced as the counter length increases, making it less feasible for compact hardware designs. As such, traditional binary counters are less efficient in modern digital applications where greater speeds and efficient hardware real estate usage are performance critical.

BRIEF DESCRIPTION OF THE DRAWINGS

Like reference symbols in the various drawings indicate like elements.

DETAILED DESCRIPTION OF THE EMBODIMENTS

Implementations of the present disclosure enable efficient counter designs using cached random-access memory (RAM) counters in high-speed digital systems (e.g., digital signal processing, telecommunications, cryptography, etc.). General counters or counter systems generally include various counters that iteratively store their count value in a memory structure. For example, such counter systems generally include counters that are iteratively read to write their respective count values to the memory structure. This approach generally requires an expensive, multi-bit multiplexer that selectively provides a respective count value from the counter to the memory structure. Additionally, this counter system has a limited count value for each counter based on the smaller of the memory structure size and the number of counters. As such, increasing the count value requires increasing both the memory structure and the counter size.

Implementations of the present disclosure include optimizations of these general counter systems by providing a plurality of incremental counters that maintain a plurality of least-significant bits of a respective count value and a respective carry bit and a RAM circuit stores a plurality of most-significant bits of the respective count value. A single-bit multiplexer receives the respective carry bit from each of the plurality of counter circuits and selectively provides a carry bit output for the respective count value and an adder circuit adds the carry bit output for the respective count value from the single-bit multiplexer to the plurality of most-significant bits of the respective count value and provides an updated plurality of most-significant bits of the respective count value for storage in the RAM circuit. In this manner, a single-bit multiplexer is provided instead of the expensive (in terms of complex circuitry, logic, and area within an integrated circuit) multi-bit multiplexer to manage a single carry bit (i.e., when the plurality of least significant bits "overflows" from a bitwise maximum value to a bitwise minimum value).

Further, the RAM circuit maintains a plurality of most-significant bits while an increment counter maintains a plurality of least-significant bits that, when combined, define the count value. Accordingly, the count value can be increased by increasing either of the RAM circuit size or the size of the incremental counters. In this manner, implementations of the present disclosure provide larger counter values for the same sized memory circuit and more efficient count updating with a single-bit multiplexer.

The details of one or more implementations are set forth in the accompanying drawings and the description below. Other features and advantages will become apparent from the description, the drawings, and the claims.

Figure 1:
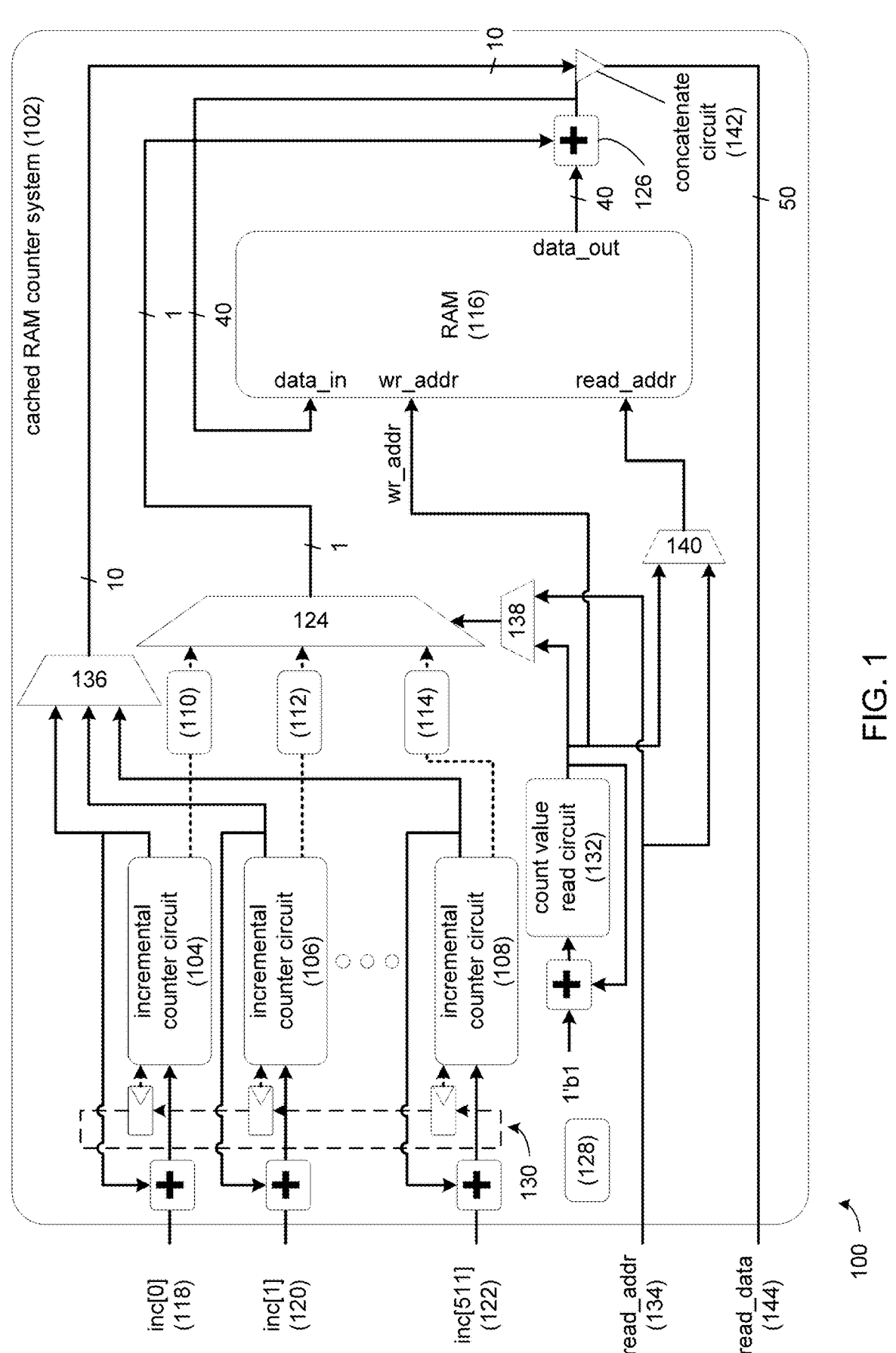
FIG. 1 is a diagrammatic view of an integrated circuit including a cached RAM counter system with a plurality of incremental counter circuits and a RAM circuit according to an example implementation.

In some implementations and referring also to FIG. 1, an integrated circuit (e.g., integrated circuit 100) and/or an integrated circuit design includes a cached random-access memory (RAM) counter system. A cached RAM counter system (e.g., cached RAM counter system) is a counter system that includes incremental counter circuits and a RAM circuit to maintain a plurality of count values, where each count value is formed by combining the plurality of bits from the incremental counter to the plurality of bits from the RAM circuit. As will be discussed in greater detail below, the incremental counter circuit maintains a plurality of least-significant bits and a carry bit that is used to update a plurality of most-significant bits stored in the RAM circuit. Additionally, cached RAM counter system 102 includes optimized carry bit circuitry to reduce the size of multiplexer (s) used to update stored count values in the RAM circuit from the plurality of bits in the respective incremental counter circuit.

In some implementations, cached RAM counter system 102 includes a plurality of incremental counter circuits associated with a plurality of count values that each maintain a plurality of least-significant bits of a respective count value and a respective carry bit. For example, an incremental counter circuit (e.g., incremental counter circuits 104, 106, 108) is a circuit that counts up by one bit (or some predefined value) each time it receives a trigger or clock signal. In some implementations, the number of each incremental counter circuit's bits is derived from the number of actual counters implemented. The number of counters implemented dictates the number of clock cycles required for each update iteration. In some implementations, incremental counter circuit 104 includes flip-flops or other digital components arranged in such a manner that their states (i.e., in terms of bits) change sequentially, representing each count. In one example, incremental counter circuit 104 includes a plurality of flip-flops connected in a cascade, where each flip-flop triggers the next one to change its state when it reaches a maximum count. As the clock signal pulses, the flip-flops transition through their states, counting from zero (or some other initial value) to a maximum count value (i.e., as represented by a plurality of bits). In some implementations, once the maximum count value is reached, incremental counter circuit 104 resets to zero (or other initial bit value) and generates a carry bit (e.g., carry bit 110, 112, 114 from incremental counter circuits 104, 106, 108, respectively). As will be described in greater detail below, the carry bit is provided to a single-bit multiplexer for selectively updating a stored count value.

Figure 2:
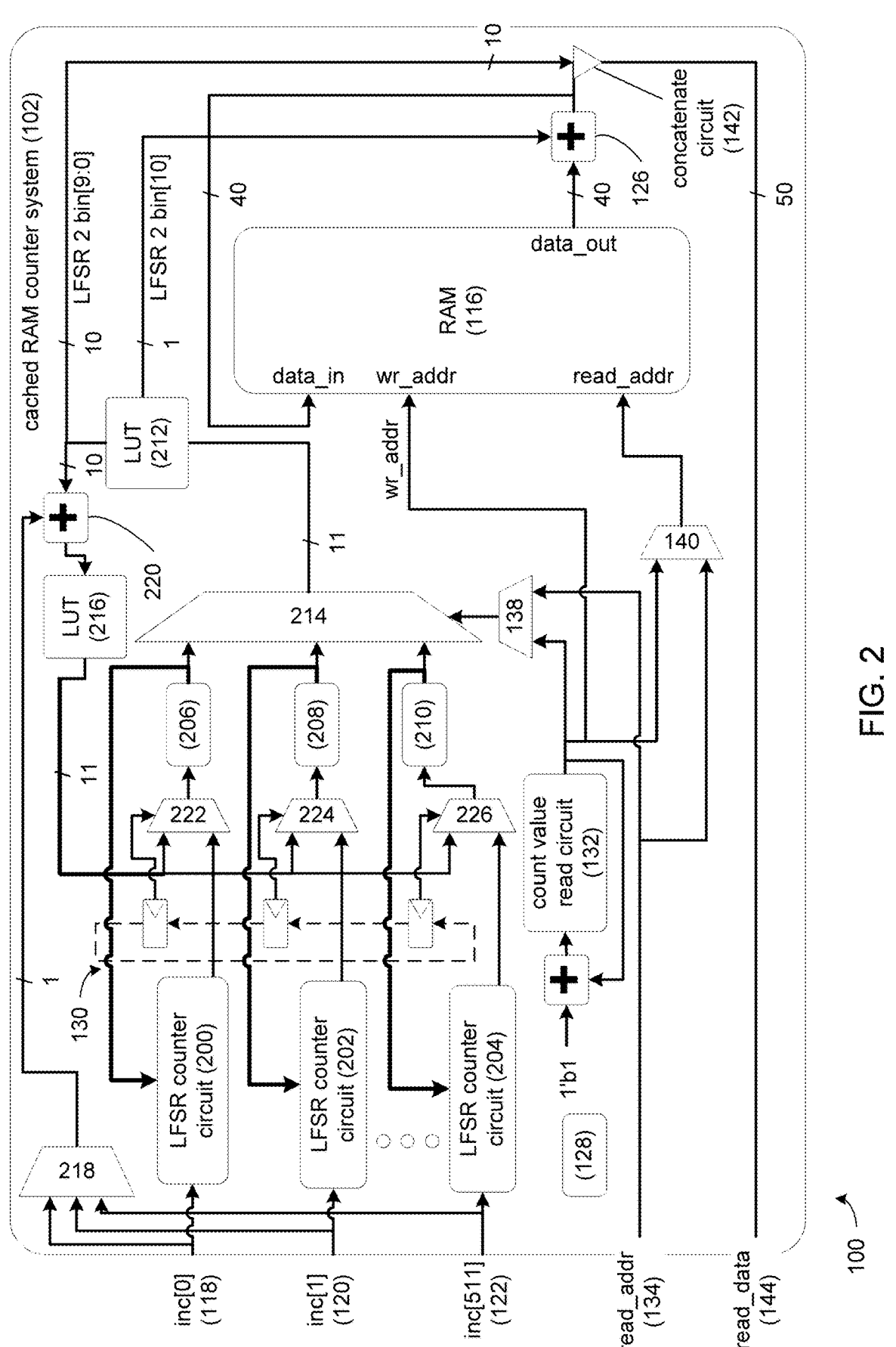
FIG. 2 is a diagrammatic view of an integrated circuit including a cached RAM counter system with a plurality of linear-feedback shift register (LFSR) counters and a RAM circuit according to an example implementation.

Referring also to FIG. 2 and in some implementations, cached RAM counter system 102 includes a plurality of linear feedback shift register (LFSR) counters (e.g., LFSR counters 200, 202, 204) associated with a plurality of count values that each maintain a plurality of least-significant bits of a respective count value and a respective carry bit. An LFSR counter is a combination of linear-feedback flip-flops and exclusive-or logic for a particular number of bits (i.e., a bit length) that cycles through a predefined set of unique bits representative of a unique set of values where the next state or combination of bits is a linear function of its previous state or previous combination of bits. For example and in some implementations, a multi-bit LFSR counter includes a shift register comprising a plurality of flip-flops. A shift register is a digital circuit (implemented as hardware and/or software circuits) using a cascade of flip-flops where the output of one flip-flop is connected to the input of the next flip-flop. The plurality of flip-flops share a clock or shift signal. In some implementations, flip-flops are serially coupled to one another with a separate flip-flop for each bit of a number of bits of the multi-bit counter (e.g., serially coupled from right to left with the most significant bit on the left-most end and the least significant bit on the right-most end).

In some implementations, LFSR counters 200, 202, 204 count through a unique sequence of bits by shifting continually through a plurality of unique values (e.g., unique sequence of bots 206, 208, 210). In one example, the plurality of unique values do not correspond to sequentially increasing binary or decimal values (e.g., 0, 1, 2, 3, etc.). Accordingly and in some implementations, cached RAM counter system 102 includes a look-up read-only table (LUT) mapping the unique sequence of bits generated by LFSR counters 200, 202, 204 to a sequential decimal count value. A look-up table (LUT) (e.g., LUT 212) is a digital circuit (implemented in hardware and/or software) that maps input signals (i.e., combination of input bit(s)) to a corresponding output signal (i.e., combination of output bit(s)). In some implementations, LUT 212 is programmed (e.g., during integrated circuit design and/or during fabrication of LFSR counters 200, 202, 204) with unique sequences of bits defined for LFSR counters 200, 202, 204 and corresponding sequential decimal count values.

In some implementations, cached RAM counter system 102 includes a RAM circuit that stores a plurality of most-significant bits of each respective count value. For example, a RAM circuit (e.g., RAM circuit 116) is a form of electronic computer memory that can be read and changed in any order, typically used to store working data and machine code. RAM circuit 116 allows data items to be read or written in almost the same amount of time irrespective of the physical location of data inside the memory. In some implementations, RAM circuit 116 takes the form of integrated circuit (IC) chips with MOS (metal-oxide-semiconductor) memory cells.

In some implementations, RAM circuit 116 stores a predefined number of most significant bits of the count value and the plurality of increment counter circuits generate a predefined number of least significant bits of the respective count value. In one example, RAM circuit 116 is a buffer used for counting increment counter circuit overlaps in order to wrap around increment counter circuit. In this example, cached RAM counter system 102 is a fifty-bit counter system (i.e., with forty bits from RAM circuit 116 and 10 from each LFSR counter) with five-hundred twelve individual increment counter circuits. As shown in FIG. 1, the five-hundred twelve counters are represented by increment counter circuits 104, 106, 108 with increment signals 118, 120, 122 for each counter.

In another example with LFSR counters, RAM circuit 116 is a buffer used for counting LFSR overlaps in order to wrap around each LFSR counter. As shown in FIG. 2, cached RAM counter system 102 includes LFSR counters (e.g., LFSR counters 200, 202, 204). In this example, cached RAM counter system is a fifty-bit counter system with five-hundred twelve individual LFSR counters. As shown in FIG. 2, the five-hundred twelve counters are represented by LFSR counters 200, 202, 204 with increment signals 118, 120, 122 for each counter. In this example, an eleven-bit LFSR counter is used for employing update-logic. Instead of using overflow-bit registers as in conventional counter systems, an update operation is done using a shared lookup table by converting the unique sequence of bits to a sequential decimal value or a sequential binary value. In this example, the resulting eleventh binary bit (the counterpart of an overflow-bit for a ten-bit count) is added to its corresponding memory entry in RAM circuit 116.

In some implementations, cached RAM counter system 102 includes a single-bit multiplexer that receives the respective carry bit from each of the plurality of counter circuits and selectively provides a carry bit output for the respective count value. For example, a single-bit multiplexer (e.g., single-bit multiplexer 124) is a digital circuit (implemented in hardware and/or software) that selects between several input signals and forwards the selected input to a single output line. As shown in FIG. 1, single-bit multiplexer 124 includes a count selector circuit (e.g., counter selector circuit 138) that provides a selection (e.g., binary representation) of the carry bit of a particular incremental counter circuit to pass to adder circuit 126. In some implementations and as will be described below, a count value read circuit provides a selection of, or reference to, a particular incremental counter circuit to obtain the carry bit associated with that particular incremental counter circuit.

Referring again to FIG. 2 and in some implementations with LFSR counters 200, 202, 204, cached RAM counter system 102 includes a multi-bit multiplexer (e.g., multi-bit multiplexer 214), in lieu of single-bit multiplexer 124, that receives the unique sequence of bits and the respective carry bit from each of LFSR counters 200, 202, 204 and selectively provides the unique sequence of bits and the respective carry bit for the respective count value to LUT 212.

In some implementations, cached RAM counter system 102, as shown in FIG. 2 and with LFSR counters 200, 202, 204, includes a reverse LUT (e.g., LUT 216) to convert the plurality of least-significant bits back into the corresponding unique sequence of bits along with an increment signal from a respective counter (e.g., increment signals 118, 120, 122 through multiplexer 218 to adder circuit 220 for adding to the plurality of least-significant bits) to accommodate for an increment signal that happens exactly on the clock-cycle where the LFSR registers are loaded with a new LFSR value (after adder circuit 220's result is converted through LUT 216). In some implementations, this updated unique sequence of bits is fed back to the input of multi-bit multiplexer 214 to either select from the LFSR counter circuit value or the updated unique sequence of bits from LUT 216 where this selection is made using a plurality of multiplexers (e.g., multiplexer 222, 224, 226) and a selection signal from a one-hot shift register signal circuit (e.g., one-hot shift register signal circuit 128) or a plurality of shift registers (e.g., plurality of shift registers 130). For example, as LFSR counter circuits 200, 202, 204 may not count sequentially, unique sequence of bits 206, 208, 210 is not "reset" to a zero value. Accordingly, cached RAM counter system 102 uses the updated unique sequence of bits from LUT 216 to define the unique sequence of bits to input to multi-bit multiplexer 214 and LFSR counters 200, 202, 204.

In some implementations, cached RAM counter system 102 includes a one-hot shift register signal circuit that generates a one-hot signal that resets the respective carry bit for each of the plurality of incremental counter circuits. A one-hot shift register signal circuit (e.g., one-hot shift register signal circuit 128) is a circuit that generates a set of bits where only one bit is high (i.e., "1") while all others are low (i.e., "0"). For example, in a multi-bit, one-hot shift register signal circuit, each bit represents a unique state, and only one bit is high at a time to indicate a current state. In some implementations, one-hot shift register signal circuit 128 generates a one-hot signal to reset a respective carry bit for the incremental counter circuits. In the example of FIG. 1, one-hot shift register signal circuit 128 generates a one-hot signal with five-hundred and twelve unique states: 00000000001; 00000000010; 00000000100; 10000000000. In some implementations, when the one-hot shift register signal circuit is asserted for a particular incremental counter circuit, the respective carry bit is reset.

In some implementations, cached RAM counter system 102 includes a plurality of shift registers that reset the respective carry bit for each of the plurality of incremental counter circuits. For example, plurality of shift registers 130 shift or cycle a bit (or a combination of bits) through each shift register for each increment counter circuit. When a "1" bit is received in a respective shift register for an increment counter circuit, the carry bit for the increment counter circuit is reset. In this manner, expensive complex logic (in terms of circuitry and/or area of an integrated circuit or integrated circuit design) is replaced with the relatively inexpensive and simple plurality of shift registers 130.

In some implementations, cached RAM counter system 102 includes an adder circuit that adds the carry bit output for the respective count value from the single-bit multiplexer to the plurality of most-significant bits of the respective count value and provides an updated plurality of most-significant bits of the respective count value for storage in the RAM circuit. For example, an adder circuit (e.g., adder circuit 126) is a circuit that performs addition of binary numbers. In one example, adder circuit 126 includes a half adder that adds two single-bit binary numbers and produces a sum bit and a carry bit. In another example, adder circuit 126 includes a full adder adds two single-bit binary numbers along with a carry input and produces a sum bit and a carry output. Generally, adder circuit 126 combines input binary numbers using logic gates to produce the sum. In one example with incremental counter circuits 104, 106, 108 as shown in FIG. 1, adder circuit 126 adds the eleventh binary bit to the stored forty most significant bits in RAM circuit 116 for the respective increment counter circuit. When the eleventh bit is a "1", the forty most significant bits are incremented by "1". When the eleventh bit is a "0", no change is made or an increment of "0" is performed on the forty most significant bits from RAM circuit 116. In another example with LFSR counters as shown in FIG. 2, adder circuit 126 adds the eleventh binary bit to the stored forty most significant bits in RAM circuit 116 for the respective LFSR counter. When the eleventh bit is a "1", the forty most significant bits are incremented by "1". When the eleventh bit is a "0", no change is made or an increment of "0" is performed on the forty most significant bits from RAM circuit 116.

In some implementations, cached RAM counter system 102 includes a count value read circuit that receives a read address associated with a respective count value and provides the read address to: the single-bit multiplexer to select the carry bit output for the respective count value, the multi-bit multiplexer to select the up-to-date respective plurality of least-significant bits of the respective count value, and the RAM circuit to obtain the plurality of most-significant bits of the respective count value for the respective count value stored in the RAM circuit. A count value read circuit (e.g., count value read circuit 132) is a circuit that manages the updating of count values by reading the carry bit from the incremental counter circuit and/or the reading of an updated count value from the combination of the plurality of least-significant bits from the respective incremental counter circuit and the plurality of most-significant bits from RAM circuit 116.

In some implementations, the count value read circuit includes a free-running counter that sequences through the plurality of count values and provides the read address associated with each count value to: the single-bit multiplexer to select the carry bit output for the respective count value and the RAM circuit to obtain the plurality of most-significant bits of the respective count value for the respective count value stored in the RAM circuit. For example, count value read circuit 132 includes a free-running counter that incrementally sequences through the plurality of count values (i.e., by sequencing through a bit value representing the incremental counter circuit associated with the plurality of count values with each clock cycle). In one example, count value read circuit 132 provides a read address (i.e., a bit value representing the incremental counter circuit) to single-bit multiplexer 124 to select the carry but output for the respective count value. Further, count value read circuit 132 provides the read address to RAM circuit 116 to obtain the plurality of most-significant bits to adder circuit 126 to be added to the carry bit output from single-bit multiplexer 124. This updated plurality of most-significant bits is then written to RAM circuit 116.

In some implementations, cached RAM counter system 102 includes a multi-bit multiplexer that receives the plurality of least-significant bits of each of the plurality of count values and selectively provides an up-to-date respective plurality of least-significant bits of the respective count value in response to receiving a read address associated with the respective count value. A multi-bit multiplexer (e.g., multi-bit multiplexer 136) is a digital circuit (implemented in hardware and/or software) that selects between several input signals and forwards the selected input to a single output line. For example, in addition to sequentially updating the count values in RAM circuit 116, count value read circuit 132 also processes read requests from outside of cached RAM counter system 102. In one example, a read address is provided to read address signal "read_addr" 134. In this example, count value read circuit 132 uses multiplexer 138 to provide the read address (i.e., a bit value representing the incremental counter circuit) to single-bit multiplexer 124 and provides multi-bit multiplexer 136 to select an up-to-date plurality of least-significant bits of a respective incremental counter circuit (i.e., the plurality of least-significant bits at the time of the read request). Additionally, count value read circuit 132 uses multiplexer 140 to provide read address to RAM circuit 116 to obtain the plurality of most-significant bits associated with the read address.

In some implementations, the count value read circuit concatenates the updated plurality of most-significant bits of the respective count value with the up-to-date respective plurality of least-significant bits to generate an up-to-date respective count value. Continuing with the above example, count value read circuit adds the carry bit output from single-bit multiplexer to the plurality of most-significant bits from RAM circuit 116 using adder circuit 126. Count value read circuit 132 concatenates (e.g., using concatenate circuit 142) the updated plurality of most-significant bits of the respective count value with the up-to-date respective plurality of least-significant bits from multi-bit multiplexer 136 to provide a complete, updated count value to "read data" 144. Accordingly, cached RAM circuit 116 provides count values with a length in bits determined by the sum of the number of bits in the incremental counter circuit (i.e., the plurality of least-significant bits) and the number of bits in the RAM circuit (i.e., the plurality of most-significant bits). In this manner, cached RAM circuit can dynamically count to various numbers (i.e., various numbers represented by a bitwise length) by combining a RAM circuit with variable incremental counter circuit lengths or vice versa.

System Overview:

In some implementations, the cached random access memory (RAM) counter system may be implemented as an entirely hardware embodiment, an entirely software embodiment (including firmware, resident software, micro-code, etc.) or an embodiment combining software and hardware aspects that are all generally be referred to herein as a "circuit," "module," "process," or "system."

For example and in some implementations, the cached random-access memory (RAM) counter system is a software component and/or hardware component of an integrated circuit (e.g., integrated circuit 100). Integrated circuits (ICs) are the building blocks for many electronic devices. An integrated circuit is a miniature electronic circuit that is fabricated onto a piece of semiconductor material, typically silicon. The fabrication process involves the deposition of various materials, such as silicon dioxide and metal, onto the semiconductor substrate, followed by etching and doping steps to create the desired circuitry. This process allows for the integration of thousands to billions of electronic components, such as transistors, diodes, and resistors, onto a single chip. In some implementations, the cached random-access memory (RAM) counter system of the present disclosure may be formed from a combination of hardware and/or software components within an integrated circuit.

In some implementations, the cached random-access memory (RAM) counter system is a software component and/or hardware component designed and implemented on a Field Programmable Gate Array. Field-Programmable Gate Arrays (FPGAs) are a type of integrated circuit that offers flexibility and reconfigurability in hardware design. Unlike Application-Specific Integrated Circuits (ASICs), which are designed for specific applications and fabricated with a fixed configuration, FPGAs can be programmed and reprogrammed after manufacturing to implement different logic functions and designs. FPGAs consist of an array of programmable logic blocks interconnected by configurable routing resources. Designers can use hardware description languages like Verilog or VHDL to describe the desired functionality, which is then synthesized into configuration files that define the routing and logic connections within the FPGA. This flexibility makes FPGAs suitable for prototyping, rapid development, and applications where adaptability or customization is required. As will be described in greater detail below, the multi-bit LFSR counter may be defined using a hardware description language and implemented using various programmable logic blocks to perform the relevant functions. As such, it will be appreciated that the cached random access memory (RAM) counter system of the present disclosure may be instantiated in software using various components that perform the same function as flip-flops, shift registers, exclusive-or logic, look-up tables, RAM, and/or multiplexers without actually including hardware versions of flip-flops, shift registers, exclusive-or logic, look-up tables, RAM, and/or multiplexers.

Application-Specific Integrated Circuits (ASICs), on the other hand, are custom-designed integrated circuits optimized for a specific application or set of tasks. ASICs are created through a process called Application-Specific Integrated Circuit Design (ASIC Design), which involves designing the circuit layout and functionality to meet the specific requirements of the target application. ASICs can offer performance advantages over general-purpose processors or FPGAs because they are tailored to the specific task at hand, leading to improved speed, power efficiency, and area utilization. ASICs can be further classified into two main categories: Full-Custom ASICs and Semi-Custom ASICs. Full-Custom ASICs involve the manual design of every transistor and interconnect in the circuit, offering the highest level of optimization but requiring significant design expertise and development time. Semi-Custom ASICs utilize pre-designed and pre-verified functional blocks, such as standard cells or IP cores, to reduce design time and complexity while still providing a high degree of customization and performance optimization. In some implementations, the cached random-access memory (RAM) counter system of the present disclosure may be designed as a part of a Full-Custom ASIC or a Semi-Custom ASIC.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A cached random-access memory (RAM) counter system comprising:

a plurality of incremental counter circuits associated with a plurality of count values that each maintain a plurality of least-significant bits of a respective count value and a respective carry bit;

a RAM circuit that stores a plurality of most-significant bits of each respective count value;

a single-bit multiplexer that receives the respective carry bit from each of the plurality of incremental counter circuits and selectively provides a carry bit output for the respective count value;

an adder circuit that adds the carry bit output for the respective count value from the single-bit multiplexer to the plurality of most-significant bits of the respective count value and provides an updated plurality of most-significant bits of the respective count value for storage in the RAM circuit; and a count value read circuit that receives a read address associated with the respective count value and provides the read address to: the single-bit multiplexer to select the carry bit output for the respective count value and the RAM circuit to obtain the plurality of most-significant bits of the respective count value for the respective count value stored in the RAM circuit.

2. The cached RAM counter system of claim 1, further comprising:

a multi-bit multiplexer that receives the plurality of least-significant bits of each of the plurality of count values and selectively provides an up-to-date respective plurality of least-significant bits of the respective count value in response to receiving a read address associated with the respective count value.

3. The cached RAM counter system of claim 2, wherein the count value read circuit further provides the read address to the multi-bit multiplexer to select the up-to-date respective plurality of least-significant bits of the respective count value.

4. The cached RAM counter system of claim 3, wherein the count value read circuit comprises a free-running counter that sequences through the plurality of count values and provides the read address associated with each count value to: the single-bit multiplexer to select the carry bit output for the respective count value and the RAM circuit to obtain the plurality of most-significant bits of the respective count value for the respective count value stored in the RAM circuit.

5. The cached RAM counter system of claim 3, wherein the count value read circuit concatenates the updated plurality of most-significant bits of the respective count value with the up-to-date respective plurality of least-significant bits to generate an up-to-date respective count value.

6. The cached RAM counter system of claim 1, further comprising:

a one-hot shift register signal circuit that generates a one-hot signal that resets the respective carry bit for each of the plurality of incremental counter circuits.

7. The cached RAM counter system of claim 1, further comprising:

a plurality of shift registers that reset the respective carry bit for each of the plurality of incremental counter circuits.

8. A multi-bit linear feedback shift register (LFSR) counter system comprising:

a plurality of incremental counter circuits associated with a plurality of count values that each maintain a plurality of least-significant bits of a respective count value and a respective carry bit;

a RAM circuit that stores a plurality of most-significant bits of each respective count value;

a single-bit multiplexer that receives the respective carry bit from each of the plurality of incremental counter circuits and selectively provides a carry bit output for the respective count value;

an adder circuit that adds the carry bit output for the respective count value from the single-bit multiplexer to the plurality of most-significant bits of the respective count value and provides an updated plurality of most-significant bits of the respective count value for storage in the RAM circuit, wherein the respective count value is formed from a combination of the updated plurality of most-significant bits of the respective count value with the plurality of least-significant bits of the respective count value; and a count value read circuit that receives a read address associated with the respective count value and provides the read address to: the single-bit multiplexer to select the carry bit output for the respective count value and the RAM circuit to obtain the plurality of most-significant bits of the respective count value for the respective count value stored in the RAM circuit.

9. The multi-bit LFSR counter system of claim 8, further comprising:

a multi-bit multiplexer that receives the plurality of least-significant bits of each of the plurality of count values and selectively provides an up-to-date respective plurality of least-significant bits of the respective count value in response to receiving the read address associated with the respective count value.

10. The multi-bit LFSR counter system of claim 9, wherein the count value read circuit further provides the read address to the multi-bit multiplexer to select the up-to-date respective plurality of least-significant bits of the respective count value.

11. The multi-bit LFSR counter system of claim 10, wherein the count value read circuit further sequences through the plurality of count values and provides the read address associated with each count value to: the single-bit multiplexer to select the carry bit output for the respective count value and the RAM circuit to obtain the plurality of most-significant bits of the respective count value for the respective count value stored in the RAM circuit.

12. The multi-bit LFSR counter system of claim 10, wherein the count value read circuit concatenates the updated plurality of most-significant bits of the respective count value with the up-to-date respective plurality of least-significant bits to generate an up-to-date respective count value.

13. The multi-bit LFSR counter system of claim 8, further comprising:

a plurality of shift registers that reset the respective carry bit for each of the plurality of incremental counter circuits.

14. An apparatus comprising:

a plurality of incremental counter circuits associated with a plurality of count values that each maintain a plurality of least-significant bits of a respective count value and a respective carry bit;

a RAM circuit that stores a plurality of most-significant bits of each respective count value;

a single-bit multiplexer that receives the respective carry bit from each of the plurality of incremental counter circuits and selectively provides a carry bit output for the respective count value;

an adder circuit that adds the carry bit output for the respective count value from the single-bit multiplexer to the plurality of most-significant bits of the respective count value and provides an updated plurality of most-significant bits of the respective count value for storage in the RAM circuit; and a count value read circuit that receives a read address associated with the respective count value and provides the read address to: the single-bit multiplexer to select the carry bit output for the respective count value and the RAM circuit to obtain the plurality of most-significant bits of the respective count value for the respective count value stored in the RAM circuit.

15. The apparatus of claim 14, further comprising:

a multi-bit multiplexer that receives the plurality of least-significant bits of each of the plurality of count values and selectively provides an up-to-date respective plurality of least-significant bits of the respective count value in response to receiving the read address associated with the respective count value.

16. The apparatus of claim 15, wherein the count value read circuit further provides the read address to the multi-bit multiplexer to select the up-to-date respective plurality of least-significant bits of the respective count value.

17. The apparatus of claim 16, wherein the count value read circuit comprises a free-running counter that sequences through the plurality of count values and provides the read address associated with each count value to: the single-bit multiplexer to select the carry bit output for the respective count value and the RAM circuit to obtain the plurality of most-significant bits of the respective count value for the respective count value stored in the RAM circuit.

18. The apparatus of claim 16, wherein the count value read circuit concatenates the updated plurality of most-significant bits of the respective count value with the up-to-date respective plurality of least-significant bits to generate an up-to-date respective count value.

19. The apparatus of claim 14, further comprising:
a one-hot shift register signal circuit that generates a one-hot signal that resets the respective carry bit for each of the plurality of incremental counter circuits.

20. The apparatus of claim 14, further comprising:
a plurality of shift registers that reset the respective carry bit for each of the plurality of incremental counter circuits.

* * * * *